(12) United States Patent
Mutangana et al.

(10) Patent No.: US 12,306,760 B2
(45) Date of Patent: May 20, 2025

(54) SECURE WIRELESS DATA PREFETCHING AND DELIVERY

(71) Applicant: FORD GLOBAL TECHNOLOGIES, LLC, Dearborn, MI (US)

(72) Inventors: Jean de Dieu Mutangana, Detroit, MI (US); Mohsen Bahrami, Birmingham, MI (US); Venkata Maruthe Ravikumara Sharma Chengalvala, Troy, MI (US); Hamed Asadi, Troy, MI (US); James Wilhelm Heaton, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 248 days.

(21) Appl. No.: 18/055,025

(22) Filed: Nov. 14, 2022

(65) Prior Publication Data
US 2024/0160573 A1 May 16, 2024

(51) Int. Cl.
*H04L 29/06* (2006.01)
*G06F 12/0862* (2016.01)

(52) U.S. Cl.
CPC .......... *G06F 12/0862* (2013.01); *G05B 2219/25205* (2013.01); *G05B 2219/36542* (2013.01); *G06F 2212/602* (2013.01)

(58) Field of Classification Search
CPC .............. G06F 12/0862; G06F 2212/602
See application file for complete search history.

(56) References Cited

U.S. PATENT DOCUMENTS

| | | | |
|---|---|---|---|
| 9,621,521 B2 | 4/2017 | Davydov | |
| 2002/0078209 A1* | 6/2002 | Peng | H04L 67/53 709/200 |
| 2007/0180125 A1* | 8/2007 | Knowles | H04L 9/12 709/227 |
| 2013/0254529 A1* | 9/2013 | Fu | H04L 9/08 713/150 |
| 2017/0293766 A1* | 10/2017 | Schnjakin | G06F 21/602 |

OTHER PUBLICATIONS

Canetti et al., Deniable Encryption, 14 pages, 1997.
Zeng et al., Concurrently Deniable Group Key Agreement and Its Application to Privacy-Preserving VANETs, Hindawi, Wireless Communications and Mobile Computing, vol. 2018, Article ID 6870742, 9 pages, 2018.

* cited by examiner

Primary Examiner — Jason K Gee
(74) Attorney, Agent, or Firm — Joseph Zane; Brooks Kushman P.C.

(57) ABSTRACT

Secure wireless data prefetching and delivery is provided. A first demand is received from a first requesting device, requesting a first data file from the central agent, the first requesting device storing first cache data including a key and a first portion of the first data file. A second demand is received from a second requesting device, requesting a second data file from the central agent, the second requesting device storing second cache data including the key and a second portion of the second data file. A function is generated configured to allow the first requesting device to generate the first data file from the first portion and to allow the second requesting device to generate the second data file from the second portion. The function is broadcast to the first and second devices, responsive to the first and second demands.

13 Claims, 4 Drawing Sheets

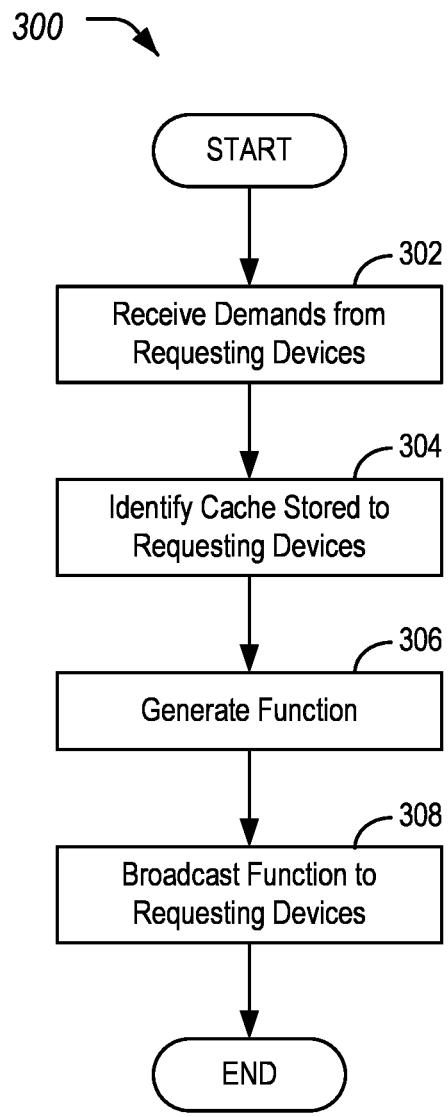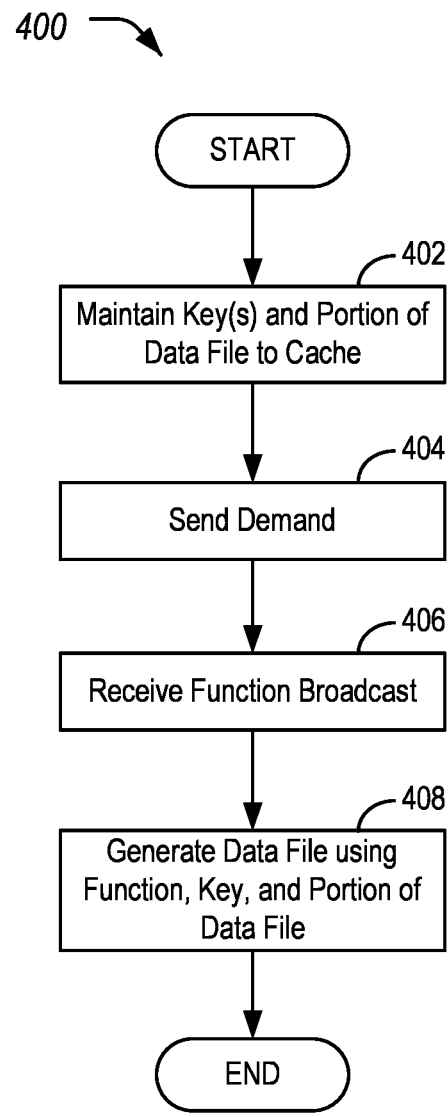
FIG. 3
FIG. 4

SECURE WIRELESS DATA PREFETCHING AND DELIVERY

TECHNICAL FIELD

Aspects of the disclosure generally relate to an approach for secure wireless data prefetching and delivery.

BACKGROUND

Modern connected vehicles come with various features that necessitate considerable data demands. For example, vehicles may include infotainment, wi-fi hotspot, and/or autonomous or semi-autonomous features that utilize vehicle connectivity to retrieve data. Since the vehicles may be on the move, wireless connectivity is an appropriate approach for satisfying the data demands.

SUMMARY

In a first illustrative embodiment, a system for secure wireless data prefetching and delivery is provided. A central agent including one or more hardware processors, programmed to receive, from a first requesting device, a first demand requesting a first data file from the central agent, the first requesting device storing first cache data including a key and a first portion of the first data file; receive, from a second requesting device, a second demand requesting a second data file from the central agent, the second requesting device storing second cache data including the key and a second portion of the second data file; generate a function configured to allow the first requesting device to generate the first data file from the first portion and to allow the second requesting device to generate the second data file from the second portion; and broadcast the function to the first and second devices, responsive to the first and second demands.

In a second illustrative embodiment, a method for secure wireless data prefetching and delivery is provided. A first demand is received from a first requesting device, requesting a first data file from the central agent, the first requesting device storing first cache data including a key and a first portion of the first data file. A second demand is received from a second requesting device, requesting a second data file from the central agent, the second requesting device storing second cache data including the key and a second portion of the second data file. A function is generated configured to allow the first requesting device to generate the first data file from the first portion and to allow the second requesting device to generate the second data file from the second portion. The function is broadcast to the first and second devices, responsive to the first and second demands.

In a third illustrative embodiment, a first requesting device for secure wireless data prefetching and delivery is provided. The first requesting device includes one or more hardware processors, programmed to: store first cache data including a key and a first portion of a first data file; send a first demand requesting the first data file from a central agent, the central agent further receiving, from a second requesting device, a second demand requesting a second data file from the central agent, the second requesting device storing second cache data including the key and a second portion of the second data file; receive, via broadcast from the central agent, a function configured to allow the first requesting device to generate the first data file from the first portion and to allow the second requesting device to generate the second data file from the second portion; and generate the first data file based on the first portion of the first data file and the key.

BRIEF DESCRIPTION OF THE DRAWINGS

FIG. 3 illustrates an example process for a central agent providing secure wireless data prefetching and delivery to vehicles;

FIG. 4 illustrates an example process for a vehicle utilizing the central agent for secure wireless data prefetching and delivery;

DETAILED DESCRIPTION

Figure 1:
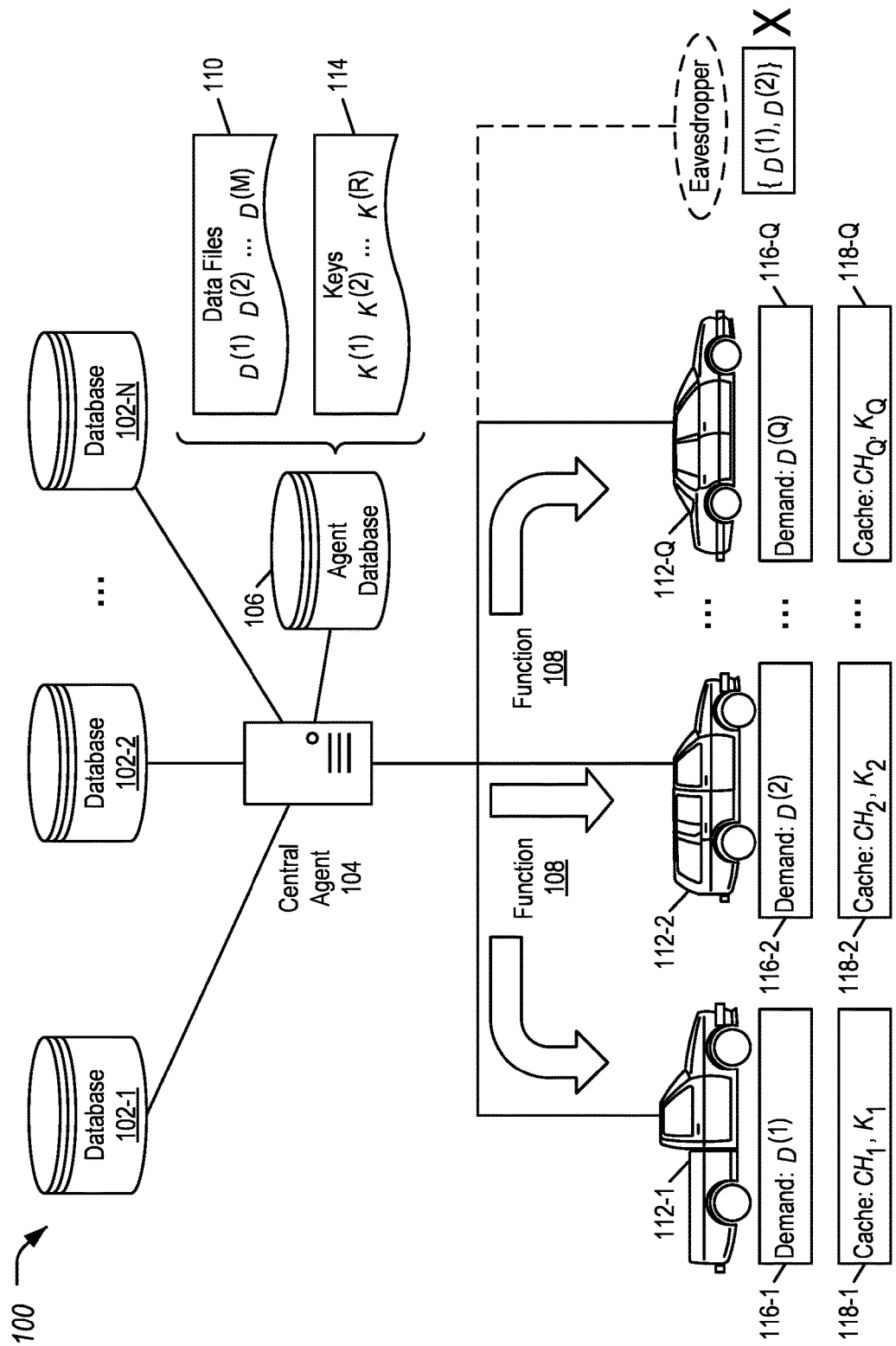
FIG. 1 illustrates an example system for implementing secure wireless data prefetching and delivery.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles may traverse areas with varying signal quality, or even areas with a lack of connectivity. Some causes of signal loss may include network congestion, vehicle speeds, blockages (i.e., block fading due to physical signal blocking objects such as buildings, hills, trees, . . . ), proximity to the nearest serving wireless access point (e.g., a Wi-Fi router, a cellular tower, . . . ) or its absence thereof. Moreover, users may face a need to manage high data sized demands on the go. For instance, the speed of a given network at a given location may only be allowing certain (and perhaps slow) speeds, thereby only enabling the users to only obtain partial data components for their desired application. Due to time constraints, the user may be able to obtain the remainder of the desired data once it reaches the second or the nth environment depending upon the signal strength and time spent at each location or region along its journey. It thus remains imperative to devise strategic mechanisms that can fend off the effects of unpredictable absence of the signal quality at the time of need. This variation in availability of data signals may lead to issues with vehicle applications that are used in maintaining the desired operation of the vehicle along its journey.

Moreover, even when network connectivity is available, the user's (i.e., vehicle's) transmitted or requested data (e.g., from central servers or third-party web portals) may be susceptible to interception by potential eavesdroppers due to the broadcast nature of the wireless medium. However, leakage of vehicular sensitive data may lead to undesirable outcomes. Therefore, in addition to achieving the desired data rates or demands, a robust vehicular communication system should implement robust network protections.

Aspects of the disclosure relates to a solution that enables connected vehicles to not only obtain desired data demands over the constantly changing wireless medium, but also to keep the data from potential eavesdroppers/wiretappers in the vicinity. More specifically, the proposed approach includes of two phases: (i) a persistent phase, whereby a central cloud agent or server (e.g., continuously) obtains data from other (e.g., third party) servers (e.g., through a wired network connection); followed by (ii) an intermittent phase, whereby, during instances of favorable wireless connectivity, a connected vehicle prefetches a portion of its desired data from a central cloud agent or server over the wireless medium.

FIG. 1 illustrates an example system 100 for implementing secure wireless data prefetching and delivery. As shown, the system 100 includes one or more databases 102-1 through 102-N (collectively databases 102) configured to store data files 110. A central agent 104 may be in communication with the databases 102.

The databases 102 may be configured to store data content or other files that a connected vehicle 112 may wish to download. The content maintained by the databases 102 may be subdivided into two subclasses: popular content and nonpopular content. Content may be indicated as being popular based on criteria such as time and location. For example, at a given instant and location, one or more files may be considered to be the most popular movies, songs, destinations, or applications.

In another example, the data classification may be done based on which vehicular applications are priority vs nonpriority. For example, it may be desirable to allow over-the-air updates to retrieve current navigation maps or other vehicle software. Such update may be considered to be priority updates. Other data, such as updates for streaming or other infotainment services may be labeled as non-priority.

The central agent 104 may be configured to capture and maintain an agent database 106 of the popular and/or priority data files 110 from the databases 102. This aspect of the operation of the system may be referred to as the persistent phase. In the persistent phase, the central agent 104 obtains the data files 110 from the databases 102. These data files 110 may then be made available for download during an intermittent phase.

The central agent 104 may also be in communication with one or more vehicles 112-1 through 112-Q (collectively vehicles 112). Each of the vehicles 112 may be associated with a corresponding token or key 114 specific to the vehicle 112. These keys 114 for the vehicles 112 participating in the system 100 may be maintained in the central agent 104. The vehicles 112 may make requests for data files 110 from the central agent 104. Such a request for a download may be referred to herein as a demand 116.

While each vehicle 112 may require a complete data file 110, it may be assumed that the vehicle 112 may already maintain a portion of the data file 110 in its memory. This is shown as a cache 118 for each vehicle 112. For instance, the vehicle 112-1 may have the portion $CH_1$ in its cache 118-1, the vehicle 112-2 may have the portion $CH_2$ in its cache 118-2, . . . and the vehicle 112-Q may have the portion $CH_Q$ in its cache 118-Q. Also, each vehicle 112 may store one or more keys 114 in the cache 118.

A function 108 of demanded data files 110 and keys 114 or tokens may be broadcast by the central agent 104 to all vehicles 112. Each vehicle 112 may utilize the function 108 and the portions of the data file 110 that it maintained in its cache 118 to compute its desired information data. The design of the function 108 ensures that secrecy of the demanded data from the central agent 104 is maintained against wiretappers or eavesdroppers. Due to the broadcast nature of the system 100, eavesdroppers in the vicinity may also be able to receive the function 108. However, as the eavesdropper may lack the key 114 and the portion of the data in the cache 118, the eavesdropper is unable to retrieve the content that is part of the demand 116 from the vehicle 112.

More formally, the system 100 may include Q vehicles 112, where each vehicle 112 $i \in \{1, 2, \ldots, Q\}$ desires data content $D^{(i)}$. At the time of data demand 116, each vehicle 112 may be assumed to be equipped with partial in-memory data in the cache 118 represented by $CH_i$. Here, the cache 118, may store both (i) a partial portion of the data file 110 and (ii) the key 114 corresponding to the vehicle 112.

Responsive to receiving demands 116 from a plurality of the vehicles 112, the central agent 104, which is to be aware of the cached data of each vehicle 112, creates and broadcasts the function 108 of all Q demanded data content: $D=\{D^{(1)}, D^{(2)}, \ldots, D^{(Q)}\}$, $Q \leq M$ (where M is the number of all data files 110 hosted by the agent database 106 and the order of files 1 through Q through M is used herein without loss of generality) and some or all of the elements in the set of keys 114 $K=\{K_1, K_2, \ldots, K_R\}$. The broadcast function 108 may be denoted by f(D, K). Each vehicle 112 may use its cache 118 set $CH_i$ and the received function 108 f(D,K) to compute its desired demand $D^{(i)}$. At the same time, its intrinsic design (which strategically embeds information data with secrecy keys/tokens) prevents demanded (information) data leakage to eavesdroppers.

Figure 2:
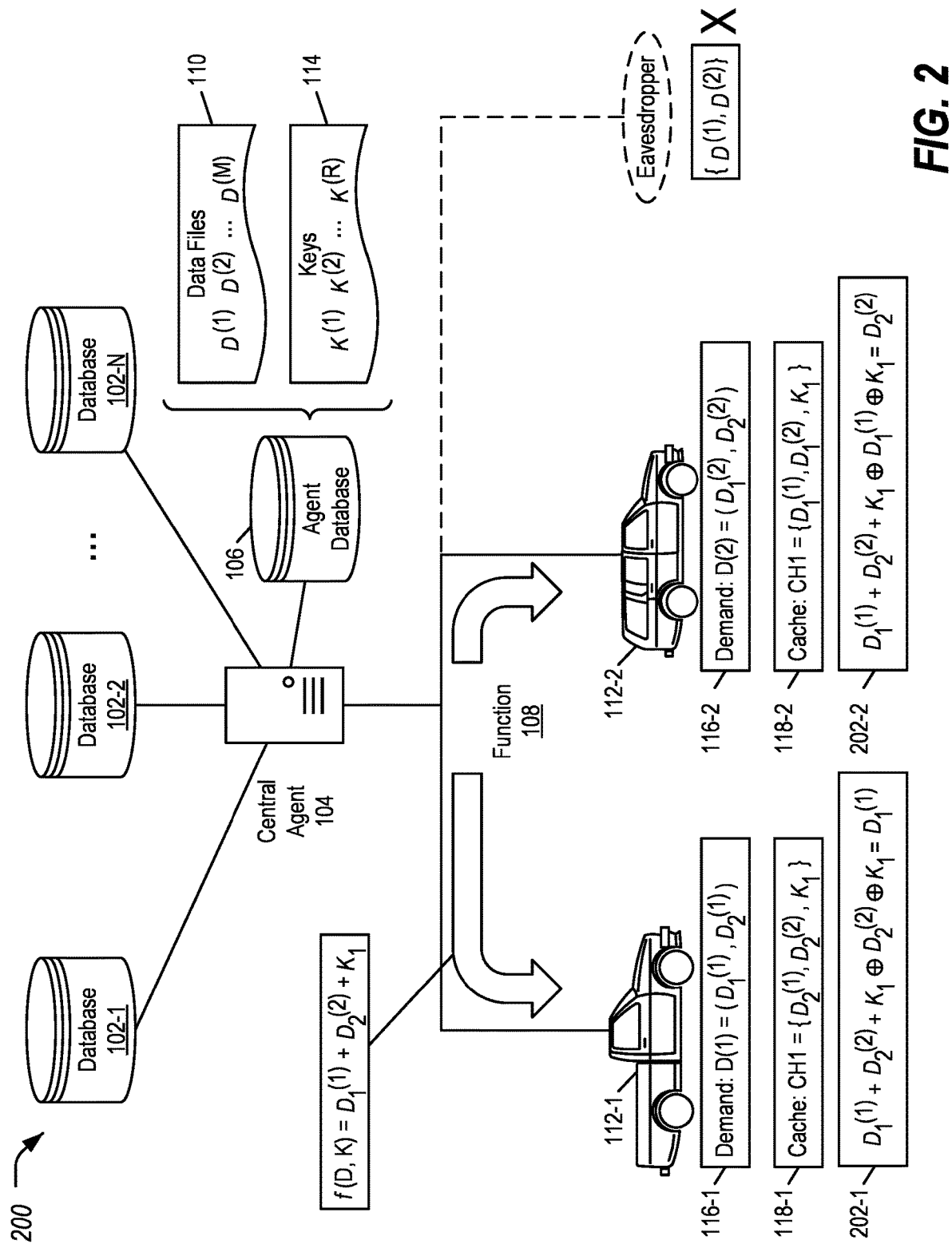
FIG. 2 illustrates an illustrative example of operation of the system for implementing secure wireless data prefetching and delivery.

FIG. 2 illustrates an illustrative example 200 of operation of the system 100 for implementing secure wireless data prefetching and delivery. As shown, two vehicles 112-1 and 112-2 respectively desire data contents $D^{(1)}$ and $D^{(2)}$. Additionally, let each demand 116-1 and 116-2, respectively, be decomposable into two data components as follows: $D^{(1)}=(D_1^{(1)}, D_2^{(1)})$ and $D^{(2)}=(D_1^{(2)}, D_2^{(2)})$. Moreover, at the time of the demand 116, let each of the vehicles 112-1 and 112-2 be respectively equipped with the following respective cache 118-1 and 118-2: $CH_1=\{D_2^{(1)}, D_2^{(2)}, K_1\}$ and $CH_2=\{D_1^{(1)}, D_2^{(2)}, K_1\}$.

Therefore, to carry out its desired application task, vehicle 112-1, which has one component of $D^{(1)}$ in its cache 118-1 (i.e., already possesses $D_2^{(1)}$ will need to obtain its remaining component, i.e., $D_1^{(1)}$ from the central agent 104. Similarly, vehicle 112-2, which has one component of $D^{(2)}$ in its cache 118-2 (i.e., already possesses $D_1^{(2)}$) will need to obtain its remaining component, i.e., $D_2^{(2)}$ from the central agent 104.

Upon receiving the demands 116-1 and 116-2, the central agent 104, which maintains in the agent database 106 the set of all information data $D=\{D^{(1)}, D^{(2)}, \ldots, D^{(M)}\}$ and all keys=$\{K_1, K_2, \ldots, K_R\}$, may generate a strategically-designed function 108 to satisfy the demands 116-1 and 116-2 and using one or more keys 114. This function 108 may be broadcast across the network, but is designed such that any present wiretapper (which is assumed to not have any cache 118 information data keys 114) cannot decode the desired data requested by the vehicles 112-1 and 112-2.

Let the central agent 104 generate and broadcast the following function 108:

$$f(D,K)=D_1^{(1)}+D_2^{(2)}+K_1;$$

where:
$D^{(1)}$ is the first data file 110 requested by the first vehicle 112-1;
$D_1^{(1)}$ is a component of $D^{(1)}$ unknown to the first vehicle 112-1;

$D_2^{(1)}$ is a component of $D^{(1)}$ known to the first vehicle 112-1 and stored to the cache 118-1;

$D^{(2)}$ is the second data file 110 requested by the second vehicle 112-2;

$D_1^{(2)}$ is a component of $D^{(2)}$ known to the second vehicle 112-2 and stored to the cache 118-2;

$D_2^{(2)}$ is a component of $D^{(2)}$ unknown to the second vehicle 112-2; and $K_1$ is a key 114 known to both the first vehicle 112-1 and the second vehicle 112-2;

As further indicated in FIG. 2, vehicle 112-1 obtains the function 108, f(D, K), and carries out computation 202-1, namely: $D_1^{(1)}+D_2^{(2)}+K_1 \oplus D_2^{(2)} \oplus K_1 = D_1^{(1)}$ to obtain its desired data component and thereby utilize the desired data file 110, $D^{(1)}$. Similarly, vehicle 112-2 obtains the function 108, f(D, K), and carries out computation 202-2, namely: $D_1^{(1)}+D_2^{(2)}+K_1 \oplus D_1^{(1)} K_1 = D_2^{(2)}$ to obtain its desired data component and thereby utilize the desired data file 110, $D^{(2)}$.

It should be noted that the function 108 may allow for the vehicles 112 to obtain the desired data component because exclusive or (XOR) has the associative property that $(A \oplus B) \oplus C \Leftrightarrow A \oplus (B \oplus C)$. Thus, the function 108 may be precomputed by the central agent 104 to allow the receiving vehicles 112 to use the information that they have and bitwise operations to compute the missing information. For instance, this designing may include performing the bitwise operations to generate an encoding that, when received by the vehicles, is decoded using the information that the vehicles 112 themselves have. In the case where the missing information is longer than the information available at the vehicles 112, the function 108 may reuse the information at the vehicles 112 as a repeating XOR encryption.

FIG. 3 illustrates an example process 300 for a central agent 104 providing secure wireless data prefetching and delivery to requesting devices. In an example, the requesting devices may be vehicles 112. However, this is only one possibility and in other instances the requesting devices may be other mobile devices, such as cellular phones, tablets, wearables, laptop computers, etc.

At operation 302, the central agent 104 receives demands 116 from requesting devices. The requesting devices may make requests for data files 110 from the central agent 104. The data files 110 may be maintained by the agent database 106 of the central agent 104, which may be configured to capture and maintain popular and/or priority data files 110 from the databases 102. An example of the central agent 104 receiving demands 116 from two vehicles 112 is shown in FIG. 2.

At operation 304, the central agent 104 identifies cache 118 stored to the requesting devices. In an example, the demands 116 from the vehicles 112 may include information that may be used by the central agent 104 to determine what cache 118 is stored to the vehicles 112. For instance, the central agent 104 may receive, from the requesting devices, an indication of the portion of the data file 110 being demanded that is already stored to the vehicle 112. For instance, the vehicle 112 may include, in the demand 116, a length of the initial portion of the data file 110 currently included in the cache 118. This value may be indicated in bytes, for example. The demand 116 may also include information with respect to what key 114 or keys 114 are available in the cache 118 of the vehicle 112. In one example, the demand 116 may indicate an identifier of a key 114 that is available in the cache 118. In another example, the demand 116 may include an identifier of the vehicle 112 which the central agent 104 may look up in the agent database 106 to retrieve the key 114 or keys 114 that are corresponding to the vehicle 112.

At operation 306, the central agent 104 generates the function 108. In an example, the central agent 104 may determine a function 108 of the form f (D, K). In an example where the central agent 104 is responding to two demands 116, the function 108 may be more specifically of the form $f(D, K) = D_1^{(1)}+D_2^{(2)}+K_1$, as noted above. It should be noted that the specific quantity of demands 116 to be serviced at once by a function 108 may vary. In another example where the central agent 104 is responding to three demands 116, the function 108 may take the form of $f(D, K) = D_1^{(1)}+D_2^{(2)}+D_3^{(3)}+K_1$. Note that, without loss of generality, the provided illustrative example is of a broadcast function 108 (and cache 118) comprising of just two data files 110 (and or file components) and a single secrecy key 114. In generalization, this function 108 could be a sum of multiple file components and secrecy keys 114 or tokens. Similarly, the cache 118 at each user could consist of one or multiple file components and secrecy keys 114 or tokens.

At operation 308, the central agent 104 broadcasts the function 108 to the requesting devices. Each vehicle 112 may accordingly use its cache 118 set $CH_i$ and the received function 108 f(D, K) to compute its desired demand $D^{(i)}$. After operation 308, the process 300 ends.

FIG. 4 illustrates an example process 400 for a requesting device utilizing the central agent 104 for secure wireless data prefetching and delivery. As noted with respect to the process 300, with respect to the process 400, the requesting device may be a vehicle 112 in an example. However, this is only one possibility and in other instances the requesting devices may be other mobile devices, such as cellular phones, tablets, wearables, laptop computers, etc.

At operation 402, the vehicle 112 maintains key(s) 114 and a portion of the data file 110 to the cache 118. While each vehicle 112 may require a complete data file 110, it may be assumed that the vehicle 112 may already maintain a portion of the data file 110 in its memory. This is shown as a cache 118 for each vehicle 112. For instance, the vehicle 112-1 may have the portion $CH_1$ in its cache 118-1, the vehicle 112-2 may have the portion $CH_2$ in its cache 118-2, . . . and the vehicle 112-Q may have the portion $CH_Q$ in its cache 118-Q. Also, each vehicle 112 may store one or more keys 114 in the cache 118.

At operation 404, the vehicle 112 sends a demand 116 to the central agent 104. In an example, the vehicle 112 may send the demand 116 to the central agent 104, requesting that the central agent 104 provide the vehicle 112 with the complete data file 110. In some examples, the vehicle 112 may further indicate how much of the data file 110 is stored to the cache 118 of the vehicle 112. This demand may be received to the central agent 104 as indicated at operation 302 of the process 300.

At operation 406, the vehicle 112 receives the function 108 broadcast via the central agent 104. In an example, the vehicle 112 receives the function 108 broadcast at operation 308 of the process 300.

At operation 408, the vehicle 112 generates the data file 110 using the function 108 the key 114 and the portion of the data file 110. Accordingly, the vehicle 112 may use its cache 118 set $CH_i$ and the received function 108 f(D, K) to compute its desired demand $D^{(i)}$. For instance, the vehicle 112 may carries out a computation 202 such as: $D_1^{(1)}+D_2^{(2)}+K_1 \oplus D_2^{(2)} \oplus K_1 = D_1^{(1)}$ to obtain its desired data component and thereby utilize the desired data file 110, $D^{(1)}$. After operation 408, the process 400 ends.

Thus, the disclosed approach may be utilized in systems 100 where vehicles 112 make demands 116 for data files 110 from a central agent 104. It should be noted that the approach may be extended to allowing the vehicles 112 to use of multiple central agents 104. In such a system 100 with multiple central agents 104, the central agents 104 need not belong to a single original equipment manufacturer (OEM). That is, the central agents 104 may belong to multiple OEMs. In turn, the functions 108 that may be broadcast by the central agents 104 may be the same or different depending upon the demanded data files 110 from each central agent 104, the keys 114 available to the central agents 104, and the cache 118 available at the vehicles 112 for use in performing the computations 202.

Different vehicles 112 may be able to communicate with the central agents 104 using a common service provider's network or via different service providers. Moreover, one vehicle 112 may demand 116 one or more data files 110 using one type of radio access technology (RAT) while another may be using the same RAT or a different technology (e.g., cellular, Wi-Fi, vehicle-to-vehicle (V2V), etc.). Additionally, each of the vehicles 112 submitting demands 116 may belong to a single or multiple OEMs, provided that an agreed upon data command protocol or registration (e.g., approved membership for network use) is in place.

The disclosed approach may provide for various benefits. In an example, the approach may enable data-dependent vehicle applications or functionalities to seamlessly operate both during good and bad network conditions by strategically taking advantage of locations and instants when signal quality is strong and prefetching desired data. In another example, the approach may actively protect vehicle-desired (and perhaps sensitive) data against potentially malicious actors or eavesdroppers. In a further example, the approach may allow users to manage high data sized demands on the go by carrying out component-wise prefetching of the desired data. More specifically, the speed of a given network at a given location may only be allowing certain (and perhaps slow speeds), thereby only enabling the users to obtain partial data components for their desired application. Due to time constraints, the user may be able to obtain the remainder of the desired data once it reaches the second or the nth environment depending upon the signal strength and time spent at each location or region along its journey.

Figure 5:
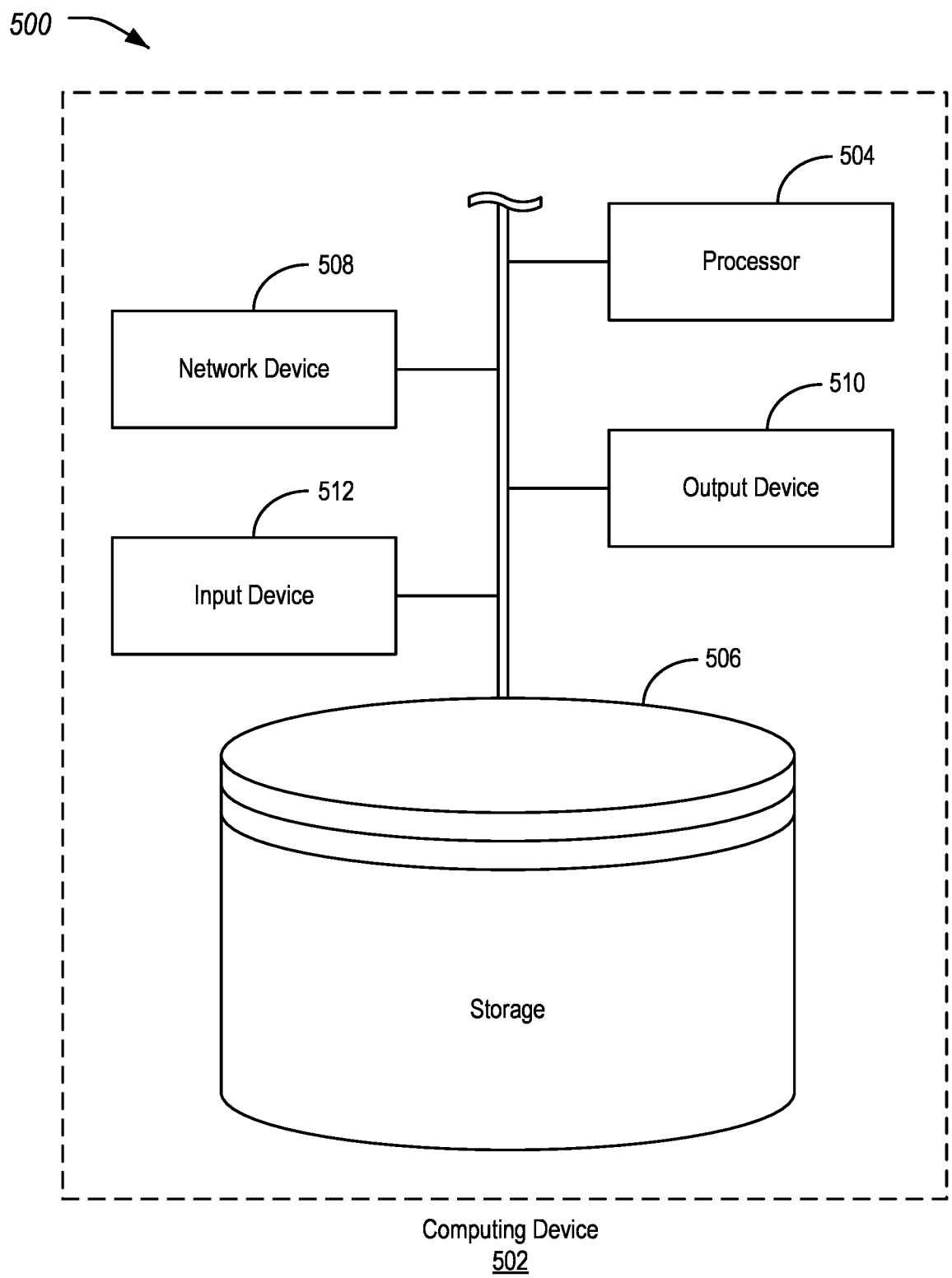
FIG. 5 illustrates an example of a computing device for use in implementing secure wireless data prefetching and delivery.

FIG. 5 illustrates an example 500 of a computing device 502 for use in implementing secure wireless data prefetching and delivery. Referring to FIG. 5, and with reference to FIGS. 1-4, the databases 102, central agent 104, agent database 106, vehicles 112, etc., may include examples of such computing devices 502. As shown, the computing device 502 may include a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices that receive human interface inputs may include keyboards, mice, trackballs, touchscreens, voice input devices, graphics tablets, and the like.

The network devices 508 may each include any of various devices that enable the databases 102, central agent 104, agent database 106, and vehicles 112, to send and/or receive data from external devices over networks (such as the communications network). Examples of suitable network devices 508 include an Ethernet interface, a Wi-Fi transceiver, a cellular transceiver, a satellite transceiver, a vehicle-to-everything (V2X) transceiver, a BLUETOOTH or Bluetooth Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for secure wireless data prefetching and delivery, comprising:
   a central agent including one or more hardware processors, programmed to
      receive, from a first requesting device, a first demand requesting a first data file from the central agent, the first requesting device storing first cache data including a key and a first portion of the first data file, the first demand including a first byte offset into the first data file indicating a length of a beginning portion of the first data file stored in the first cache data;
      receive, from a second requesting device, a second demand requesting a second data file from the central agent, the second requesting device storing second cache data including the key and a second portion of the second data file, the second demand including a second byte offset into the second data file indicating a length of a beginning portion of the second data file stored in the second cache data;
      generate a function configured to allow the first requesting device to generate the first data file from the first portion and to allow the second requesting device to generate the second data file from the second portion; and
      broadcast the function to the first and second devices, responsive to the first and second demands.

2. The system of claim 1, wherein the function is of the form $f(D, K) = D_1^{(1)} + D_2^{(2)} + K_1$, where $D_1^{(1)}$ is the first portion of the first data file, $D_2^{(2)}$ is the first portion of the second data file, and $K_1$ is the key.

3. The system of claim 2, wherein the first requesting device is configured to generate the first data file based on the first portion of the first data file and the key, and the second requesting device is configured to generate the second data file based on the second portion of the second data file and the key.

4. The system of claim 3, wherein the first requesting device determines the first data file using a first equation of the form: $D_1^{(1)} + D_2^{(2)} + K_1 \oplus D_2^{(2)} \oplus K_1 = D_1^{(1)}$, and the second requesting device determines the second data file using a second equation of the form: $D_1^{(1)} + D_2^{(2)} + K_1 \oplus D_1^{(1)} \oplus K_1 = D_2^{(2)}$.

5. A method for secure wireless data prefetching and delivery, comprising:
   by a central agent including one or more hardware processors:
      receiving, from a first requesting device, a first demand requesting a first data file from the central agent, the first requesting device storing first cache data including a key and a first portion of the first data file, the first demand including a first byte offset into the first data file indicating a length of a beginning portion of the first data file stored in the first cache data;
      receiving, from a second requesting device, a second demand requesting a second data file from the central agent, the second requesting device storing second cache data including the key and a second portion of the second data file, the second demand including a second byte offset into the second data file indicating a length of a beginning portion of the second data file stored in the second cache data;
      generating a function configured to allow the first requesting device to generate the first data file from the first portion and to allow the second requesting device to generate the second data file from the second portion; and
      broadcasting the function to the first and second devices, responsive to the first and second demands.

6. The method of claim 5, wherein the function is of the form $f(D, K) = D_1^{(1)} + D_2^{(2)} + K_1$, where $D_1^{(1)}$ is the first portion of the first data file, $D_2^{(2)}$ is the first portion of the second data file, and $K_1$ is the key.

7. The method of claim 6, wherein the first requesting device is configured to generate the first data file based on the first portion of the first data file and the key, and the second requesting device is configured to generate the second data file based on the second portion of the second data file and the key.

8. The method of claim 7, wherein the first requesting device determines the first data file using a first equation of the form: $D_1^{(1)} + D_2^{(2)} + K_1 \oplus D_2^{(2)} \oplus K_1 = D_1^{(1)}$, and the second requesting device determines the second data file using a second equation of the form: $D_1^{(1)} + D_2^{(2)} + K_1 \oplus D_1^{(1)} \oplus K_1 = D_2^{(2)}$.

9. A first requesting device for secure wireless data prefetching and delivery, comprising:
   one or more hardware processors, programmed to:
      store first cache data including a key and a first portion of a first data file;
      send a first demand requesting the first data file from a central agent, the central agent further receiving, from a second requesting device, a second demand requesting a second data file from the central agent, the second requesting device storing second cache data including the key and a second portion of the second data file, the first demand including a first byte offset into the first data file indicating a length of a beginning portion of the first data file stored in the first cache data, the second demand including a second byte offset into the second data file indicating a length of a beginning portion of the second data file stored in the second cache data;
      receive, via broadcast from the central agent, a function configured to allow the first requesting device to generate the first data file from the first portion and to allow the second requesting device to generate the second data file from the second portion; and
      generate the first data file based on the first portion of the first data file and the key.

10. The first requesting device of claim 9, wherein the one or more hardware processors are further programmed to indicate, to the central agent, a length of the first portion of the first data file that is stored in the first cache data.

11. The first requesting device of claim 9, wherein the function is of the form $f(D, K) = D_1^{(1)} + D_2^{(2)} + K_1$, where $D_1^{(1)}$ is the first portion of the first data file, $D_2^{(2)}$ is the first portion of the second data file, and $K_1$ is the key.

12. The first requesting device of claim 11, wherein the first requesting device is configured to generate the first data file based on the first portion of the first data file and the key, and the second requesting device is configured to generate the second data file based on the second portion of the second data file and the key.

13. The first requesting device of claim 12, wherein the first requesting device determines the first data file using a first equation of the form: $D_1^{(1)}+D_2^{(2)}+K_1 \oplus D_2^{(2)} \oplus K_1 = D_1^{(1)}$, and the second requesting device determines the second data file using a second equation of the form: $D_1^{(1)}+D_2^{(2)}+K_1 \oplus D_1^{(1)} \oplus K_1 = D_2^{(2)}$.

* * * * *